July 20, 1937.
R. C. PIERCE
2,087,703
TANK CAR
Filed June 22, 1931
3 Sheets-Sheet 1
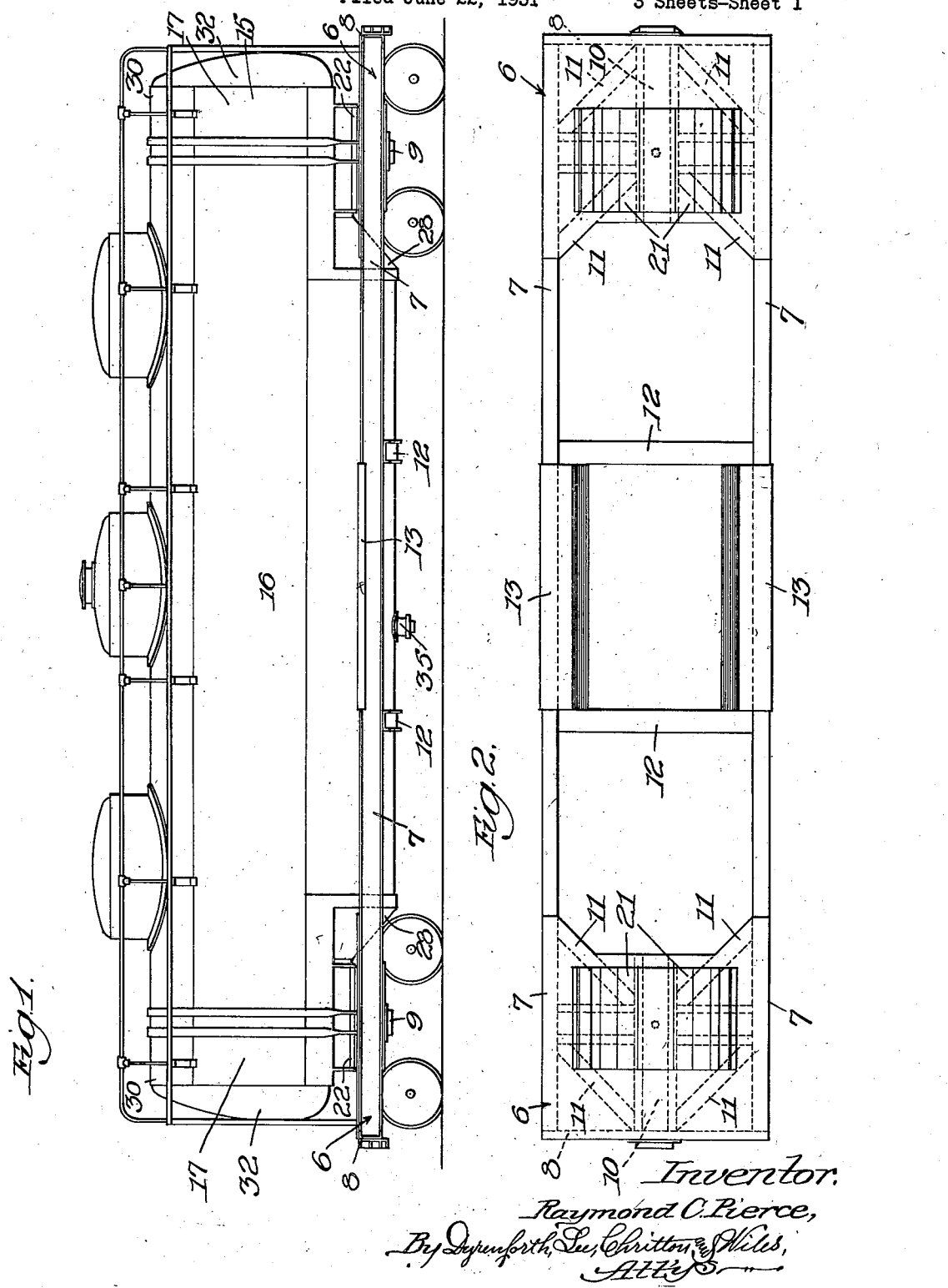
Inventor:
Raymond C. Pierce,
By Dyrenforth, Lee, Chritton & Wiles,
Attys.

July 20, 1937.   R. C. PIERCE   2,087,703
TANK CAR
Filed June 22, 1931   3 Sheets-Sheet 2
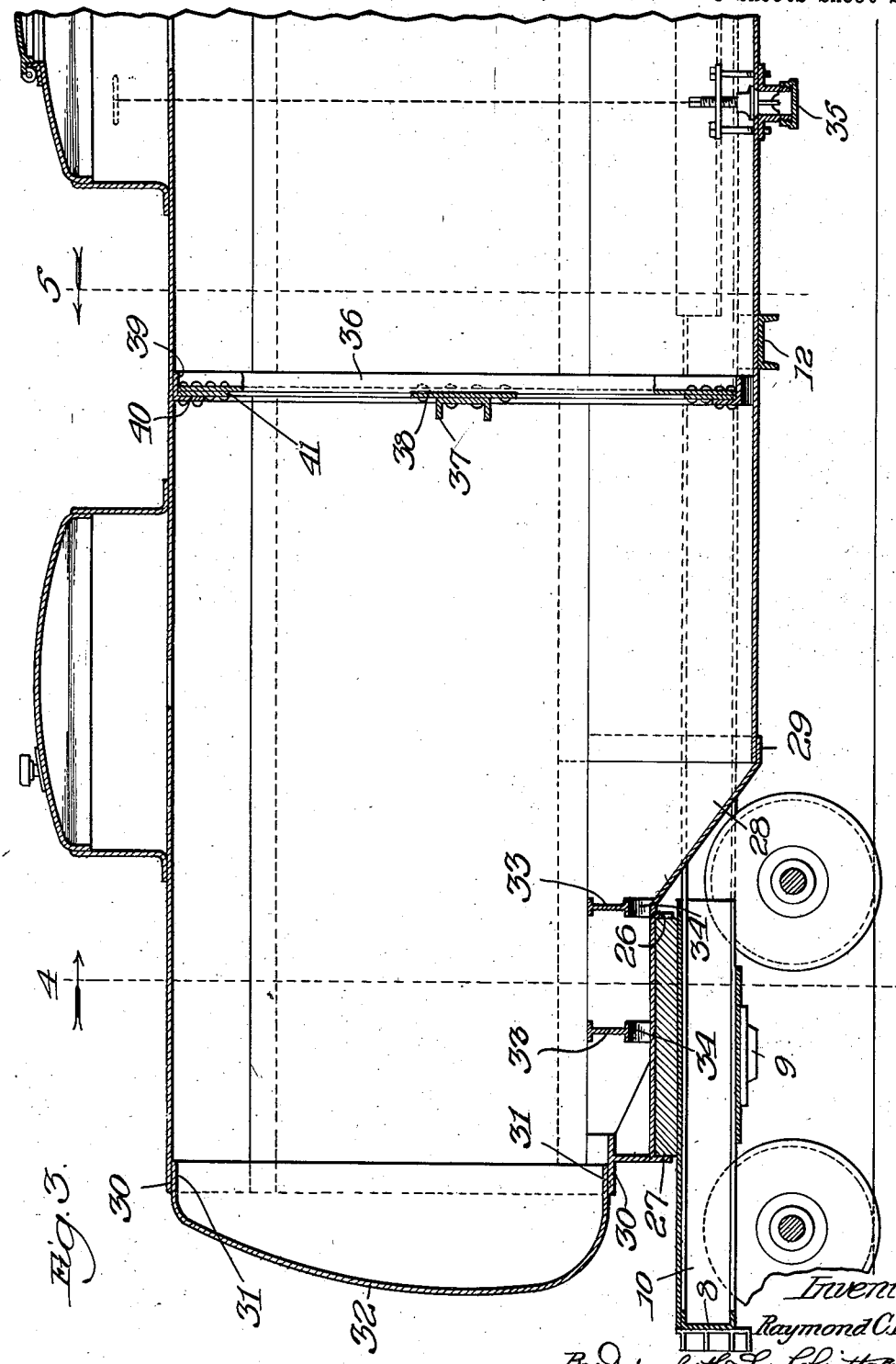

July 20, 1937.  R. C. PIERCE  2,087,703
TANK CAR
Filed June 22, 1931  3 Sheets-Sheet 3
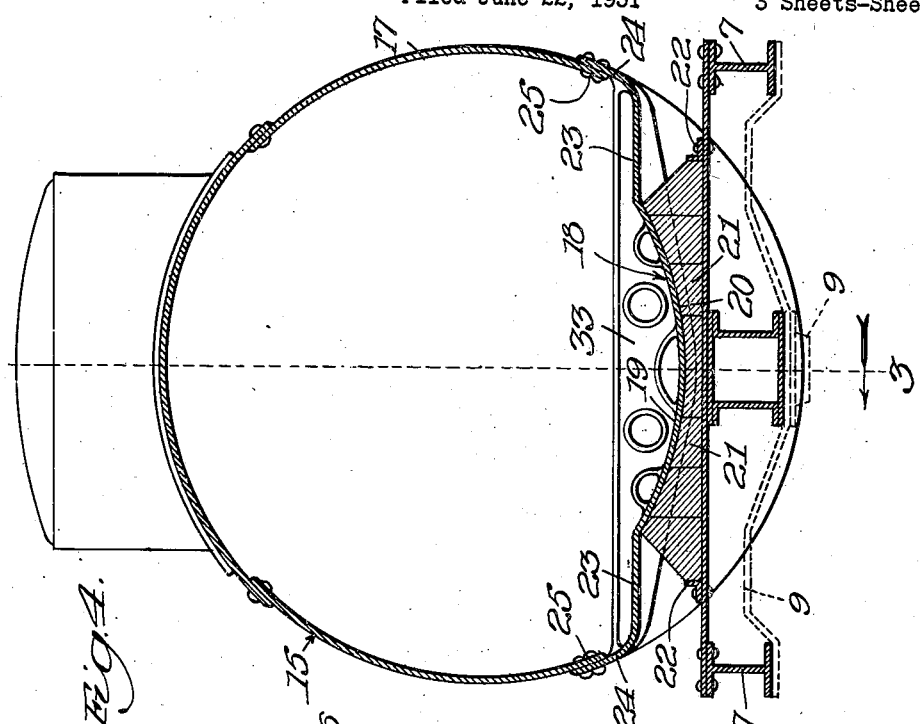
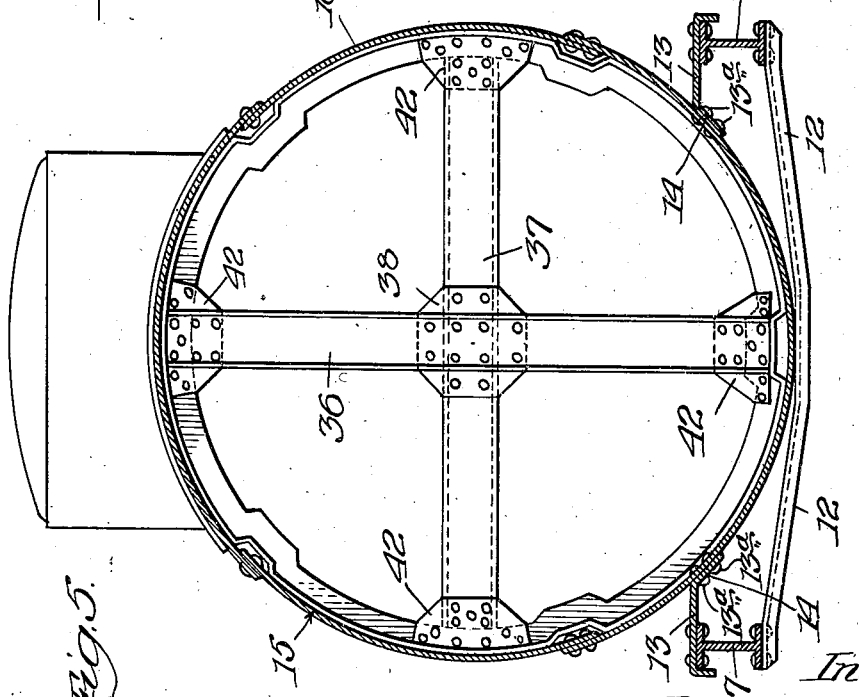
Inventor:
Raymond C. Pierce, Patented July 20, 1937

2,087,703

UNITED STATES PATENT OFFICE 2,087,703

TANK CAR

Raymond C. Pierce, Chicago, Ill., assignor to General American Tank Car Corporation, a corporation of West Virginia Application June 22, 1931, Serial No. 546,091

7 Claims. (Cl. 105—362)

As a preface to a description of my invention, it may be stated that tank cars, having cylindrical tanks, as commonly constructed, present the limitation of relatively small capacities, it being impossible, within the limits of practicability, to make them of a capacity exceeding 12,000 gallons. This limitation is imposed because of the design conditions necessitating the imposing of the weight of the tank and loading directly on the car bolsters which latter must be connected together by suitable center sills or side sills which resist the train-buffing stresses. This condition requires that the cylindrical tank seat on the bolsters and extend above the sills which imposes limitations upon the diameter of the tank and the height to which it may extend and consequently its capacity, as it is necessary that the center of gravity of the car be kept low and that the desired clearance at the top of the car be presented.

My primary object is to provide a construction of tank car of a design approximating that of the standard cylindrical tank car but which may be made to provide capacities greatly exceeding those of standard design even up to as high as 35,000 gallons and within the established clearance limits and having the lowest possible center of gravity; to provide for the application of the tank to the car-underframe and its removal therefrom, as a unit separate from the underframe; and permit of the relatively economical manufacture and repair of such large capacity tank cars; and other objects as will be manifest from the following description.

Referring to the accompanying drawings:

Figure 1 is a view in side elevation of a tank car constructed in accordance with my invention.

Figure 2 is a plan view of the underframe of the car of Fig. 1.

Figure 3 is an enlarged view in longitudinal sectional elevation of one end of the car, the section being taken at the line 3 on Fig. 4 and viewed in the direction of the arrow.

Figure 4 is a section taken at the line 4 on Fig. 3 and viewed in the direction of the arrow; and Figure 5, a section taken at the line 5 on Fig. 3 and viewed in the direction of the arrow.

Referring to the particular illustrated embodiment of my invention, 6 represents the underframe of a car which may be of any desirable construction of the side-sill type and comprising side sills 7 connected at their ends with end sills 8 and intermediate their ends with bolsters 9, the ends of the underframe being provided with bracing comprising center beams 10, extending through the bolsters 9, and angle braces 11 connected with the beams 10 and the side sills 7. The underframe midway between its ends is provided with cross-bars 12 secured at their ends to the undersides of the side-sills 7 and plates 13 at opposite sides of the car extending lengthwise of the underframe and secured along their outer edges to the tops of the side sills 7 with their inner edge portions downwardly deflected as represented at 14, the tank hereinafter described being attached to the portions 14 for anchoring the tank against the lengthwise movement, the cross-bars 12 serving to prevent outward springing of the side-sills 7.

The tank of the car is represented at 15 and comprises a central portion 16 of cylindrical shape at which it rests on, and is riveted to, the anchor plates 13 as represented at 13$^a$, and end portions 17 the greater cross-sectional portions of which are cylindrical and form continuations of the alining cylindrical portions of the center cylindrical tank-portion 16, the lower portions of the tank ends being of deformed shape as illustrated in Fig. 4.

The tank, except for the lower deformed portions of the tank ends 17, may be constructed of any suitable material such as rolled plate as commonly used in the making of cylindrical tanks, and its deformed portions referred to are formed of the members represented at 18 which are preferably castings, each shaped as shown to provide a portion 19 curved midway between its sides crosswise of the car. The members 18 rest at their convex undersurfaces, curved crosswise of the longitudinal axis of the car, on the upwardly concaved surfaces 20 of slabbing 21 supported on the bolsters 9 and held against lateral displacement as by means of angle-irons 22 secured to the bolsters.

The side portions of the members 18 beyond the saddles thus formed by the slabbing 21, are substantially straight and horizontal as represented at 23 and terminate in upwardly extending flanges 24 which lap, and are riveted to, the depending edges 25 of the plate metal forming the upper portions of the ends 17 of the tank, the members 18 having depending flanges 26 and 27 at which they embrace the slabbing 21.

Each member 18 presents at its inner end a portion 28 which flares downwardly toward the center of the car as shown and terminates in a curved flange 29 which laps, and is secured to, the adjacent end of the lower part of the cylindrical portion 16. The outer ends of the members 18 terminate in flanges 30 which, in conjunction with the outer ends of the tank portions 17, form continuous walls at the opposite ends of the tank with which the flanges 31 of tank-ends 32 are telescoped and to which they are rigidly secured.

The members 18 are preferably provided with ribs 33 integral therewith and extending crosswise of these members from side to side thereof at the portions thereof above the slabbing 21 and thus extending across the substantially flat surfaces 23 of the members 18, these ribs being apertured along their lower edges, as represented at 34, to permit of draining of the lading from the ends of the tank into the cylindrical portion thereof to the outlet represented at 35.

The tank because of its large diameter may be, and preferably is, internally braced at opposite sides of its center to avoid objectionable distortion thereof, as for example by the bracing shown and comprising crossed beams 36 and 37 shown as of channel form and disposed back-to-back, with a gusset plate 38 interposed therebetween at the point of intersection of those beams. The cylindrical portion 16 of the tank is provided about its inner surface, in registry with each bracing construction, with an angle-iron hoop 39 presenting an inwardly extending flange 40.

The ends of the beams 36 and 37 are provided with gusset plates 41 and 42 secured thereto, respectively, and flatwise to the hoop 39, the plates 41 and 42 being of the same thickness as the gusset plate 38 and located in the same plane crosswise of the tank as the plate 38 and thus all of the plates 41 and 42 lie flatwise against the hoop 39.

By forming the end portions of the tank of the members 18 which may be castings as stated, the use of rivets in the vicinity of the slabbing where the forces exerted against the tank are greatest and leaks are most likely to occur where rivets are used at these locations, is avoided; these members, while of a size sufficient to function satisfactorily, and even though more expensive than rolled plate metal of the same area, are of such small size that the tank may be constructed relatively inexpensively, and they permit of easy moulding and are not liable to be porous which often occurs in the case of large steel castings particularly when of irregular cross section.

The use of such members permits of the resting of the weight of the tank on the bolsters and yet permits the tank-structure to extend downwardly at the cylindrical part of the tank between the trucks sufficiently far, to construct the tank of the maximum diameter consistent with the clearance limit which, according to standard requirements, must be observed, and cause the center of gravity of the car structure to be maintained relatively low.

Furthermore, the provision of the members 18 as shown is of advantage in connection with the capability of the car to resist the severe torsional stresses imposed thereon due to travel over poor tracks or a poor road bed. The provision of the substantially flat surfaces 23 and the convex under surface of the portion 19 at which latter surface sole contact is made with the upwardly concaved seating surface of the slabbing permits of the torsional movement of the underframe relative to the tank in much the same manner as the conventional tank cars, and thus avoids wrenching of the tank even when of large diameter.

The use of the members 18 at the bolsters permits of the use of cross-bracing as shown which carries the upward reactions of the slabbing out to the side walls of the tank, and the flanges 26 and 27, preferably employed, increase the strength of the members 18 and are also of advantage in maintaining the slabbing against movement longitudinally of the car.

The anchor plates 13 present a number of advantages. The maximum stress in the side sills being at the center such plates serve to increase the strength of the sills, as well as form suitable center anchorage for the tank; and the provision of these plates to present the portions which extend inwardly beyond the sides of the sills adds to the strength of the structure, affords a connection between the tank and side sills preventing the exertion of undue vertical stresses due to the weight of the tank against the side wall of the latter and corresponding vertical forces on the side sills which are primarily designed to withstand horizontal buffing and tensional forces rather than vertical ones, and further affords to the anchor a desired degree of flexibility due to the springiness of these inwardly extending unsupported portions.

Another important advantage of a tank car built in accordance with my invention is that the tank is a unit separate from the underframe, thus permitting the tank to be built separately from the underframe and tested for leaks and the necessary work of calking and stopping such leaks as may exist, performed and the tank then assembled with the underframe, in the usual manner and without production delay.

Furthermore, the tank, in case of accidental damage, may be repaired as easily as the standard type of tank car of far less capacity, due primarily to the adaptability of the separation of the tank as a unit from the underframe of the car.

While I have illustrated and described a particular embodiment of my invention, I do not wish to be understood as intending to limit it thereto as the same may be variously modified and altered without departing from the spirit of my invention.

What I claim as new, and desire to secure by Letters Patent, is:

1. A tank car comprising an underframe having side sills, a tank on said underframe and spaced from said side sills, and means anchoring said tank on said underframe comprising plates secured to the side sills and to said tank and spanning the spaces between said side sills and said tank and resiliently supporting the latter.

2. A tank car comprising an underframe having side sills, a tank on said underframe and spaced from said side sills, and means anchoring said tank on said underframe comprising plates secured to the side sills and extending inwardly beyond said sills and across the spaces between said tank and side sills and attached at their inner ends to said tank, said plate resiliently supporting said tank.

3. A tank car comprising an underframe having side sills, a tank on said underframe, and means anchoring said tank on said underframe comprising plates secured at the center of the car to the side sills and extending inwardly beyond said sills and deflected downwardly and attached at said downwardly deflected portions to said tank.

4. A tank car comprising an underframe having side sills, a tank on said underframe and spaced from said side sills, and means anchoring said tank on said underframe comprising plates secured at the center of the car to the side sills and to said tank and spanning the spaces between said side sills and said tank and resiliently supporting the latter.

5. A tank car comprising an underframe having side sills, a tank on said underframe, and means anchoring said tank on said underframe comprising plates secured to the side sills and extending inwardly beyond said sills and deflected downwardly and attached at said downwardly deflected portions to said tank.

6. A tank car comprising an underframe having side sills, a tank on said underframe and spaced from said side sills, and means anchoring said tank on said underframe comprising plates secured to the side sills and forming cover plates therefor to reinforce the side sills and extending across the spaces between said tank and side sills and secured at their inner free edges to the tank and resiliently supporting the latter.

7. A tank car comprising an underframe having side sills, a tank on said underframe and spaced from said side sills, and means anchoring said tank on said underframe comprising plates having flanges at their outer edges, said plates being secured at their outer portions to the side sills and forming cover plates therefor to reinforce the side sills and extending across the spaces between said tank and side sills and secured at their inner free edges to the tank.

RAYMOND C. PIERCE.